UNITED STATES PATENT OFFICE.

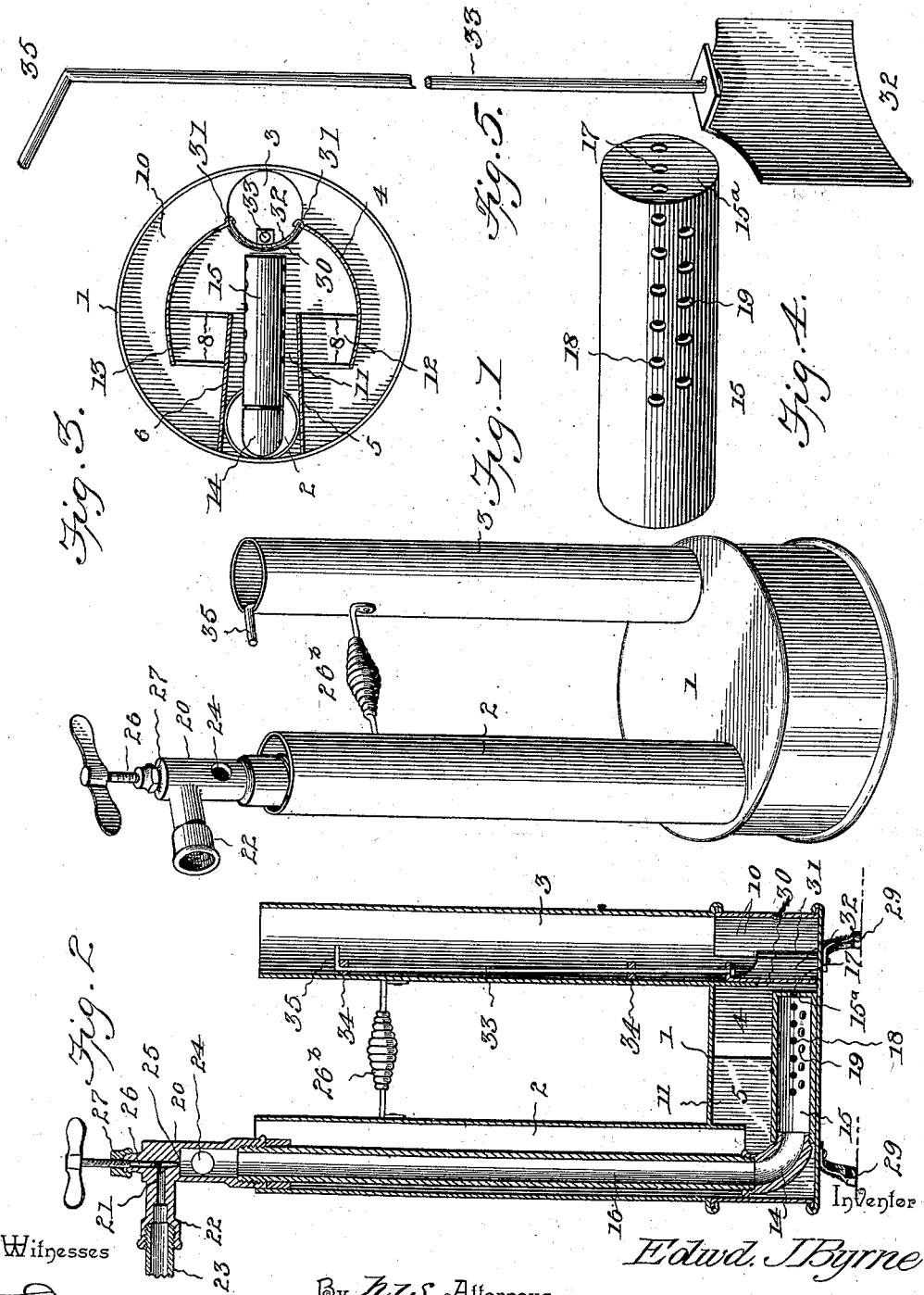

EDWARD J. BYRNE, OF BALTIMORE, MARYLAND.

SUBMERGED HEATER.

SPECIFICATION forming part of Letters Patent No. 638,195, dated November 28, 1899.

Application filed October 18, 1897. Renewed January 25, 1899. Serial No. 703,391. (No model.)

*To all whom it may concern:*

Be it known that I, EDWARD J. BYRNE, a citizen of the United States, residing at Baltimore, in the State of Maryland, have invented a new and useful Submerged Heater, of which the following is a specification.

My invention relates to improvements in heaters of that class which are to be submerged in water for the purpose of heating the same; and the object that I have in view is to provide a simple structure which may be used in a manner to heat water in a bathtub and to warm the room in which the bathtub is situated, although the device may be used generally for heating liquids by submerging it in the liquid.

A further object of the invention is to so construct the heater as to secure to the best advantage a uniform distribution of the heat, so as to apply the heat to all the surfaces with which the water may come in contact, to provide for the ignition of the fuel at the burner when the heater is submerged in the liquid, and to simplify the construction with a view to making it compact and durable, efficient and reliable, and cheap of manufacture.

To the attainment of these ends the first part of the invention consists in a heater provided with a chamber, a burner contained or housed therein, flues for the circulation of air to and from said chamber, and a regulator to control the passage of air and heat, whereby the heat may be caused to circulate in the chamber in a circuitous course and permitted to escape from the chamber directly into one of the air-flues.

The invention further consists in a submerged heater having a burner-chamber, an upright mixing-flue communicating with the burner in said chamber, and air and gas inlets communicating with said mixing-flue and located at a point to insure the free ingress of the air, whereby the air and gaseous fuel may be intimately and thoroughly commingled as they circulate through the mixingflue and before entering the burner.

The invention further consists in a submerged heater in which the burner-containing chamber is constructed to provide for the circuitous circulation of heat therein, so as to provide for the application of heat to the bottom and sides as well as to the top of the chamber, in combination with air-flues communicating with the chamber and a burner situated within the chamber; and the invention further consists in the novel combination of elements and in the construction and arrangement of parts which will be hereinafter fully described and claimed.

To enable others to understand my invention, I have illustrated the preferred embodiment thereof in the accompanying drawings, forming a part of this specification, and in which—

Figure 1 is a perspective view of a submerged heater and radiator embodying my invention. Fig. 2 is a vertical sectional view thereof, taken through the air-flues. Fig. 3 is a horizontal sectional view on the plane indicated by the dotted line 3 3 of Fig. 2. Fig. 4 is a detail perspective view of the burner detached from the heater, and Fig. 5 is a detail view of the regulator or damper for use in the heater.

Like numerals of reference denote like and corresponding parts in each of the several figures of the drawings.

1 designates the shell of my improved heater, and 2 3 are the air-tubes, which are attached or fastened to the shell in any suitable manner, so that the tubes open into or communicate with the chamber of the shell. I prefer to construct the shell and the air-tubes of sheet metal and to unite the parts of the shell together by solder or seam joints, while the air-tubes may be united to the shell by solderjoints; but the detailed construction of these parts may be varied within the skill of the mechanic. The shell may be of the circular form shown by the drawings; but it may be of any other preferred shape. The air-tubes 2 3 are of sufficient length to extend above the level or surface of the water in which the heater is submerged.

The interior of the shell 1 is divided or constructed to secure a circuitous or tortuous circulation of the heat or hot air therein, so as to secure uniform distribution of the heat and to cause it to impinge against the entire area of the surface of the heater. This division of the chamber in the shell 1 is effected by the provision of partitions or deflectors, which are preferably of cast metal for simplicity in construction and cheapness of manufacture, and such cast-metal construction of the partitions or deflectors is also advantageous, in that it adds weight to the heater for the purpose of keeping it submerged in the water against any tendency to rise therein owing to the buoyancy of the structure.

My preferred means for dividing the interior of the chamber in the shell 1 consists in the employment of a curved partition or deflector 4 and two short partitions 5 6, which are arranged within the shell-chamber to form the flues therein, substantially as indicated by Fig. 3. As hereinbefore stated, these partitions or deflectors 4 5 6 are all cast in a single piece of metal and the short partitions 5 6 are joined to the curved partition 4 by short transverse ribs 8 integral with the partitions. The curved partition 4 is arranged substantially concentric to or parallel with the vertical wall of the shell 1, so as to leave between the partition 4 and the wall of the shell a flue 10. I prefer to extend the lower end of the air-flue 2 into the shell 1, so as to terminate below the upper wall or head of the shell, as shown by Fig. 2. The short straight partitions 5 6 are disposed in inclined positions on opposite sides of the lower protruding end of the air-inlet flue 2, and said partitions 5 6 extend from the annular wall of the shell into the space inclosed within the curved wall or partition 4, whereby the partitions 5 6 form between themselves a central space 11, and they form between the partition 4 and the partitions 5 6 the reverse-flues 12 13. The burner, to be presently described, is situated in the central space 11 within the shell, and the heat or hot air from the burner and the air-inlet flue 2 is adapted to divide and pass through the flues 12 13 and thence into the flue 10. The described construction of the partitions or deflectors serves to divide the interior of the shell into flues through which the heat is compelled to travel in a tortuous course, so as to secure the distribution of the heat to the best advantage and to effect its application to the walls of the shell 1 throughout the entire area thereof.

15 designates the burner, which is contained or housed within the central space 11 of the shell. This burner is of the tubular form shown and occupies a horizontal position in the central part of the shell. The burner is coupled or united at one end by an elbow-coupling 14 to a mixing tube or pipe 16, and the other free end of the burner is provided with a head 15ª, which substantially closes the free end of the burner. This head of the burner is provided with a series of centrally-disposed gas-openings 17, and along each side of the burner it is provided with two series of horizontally-arranged outlet-openings 18 19. The openings in the sides of the burner designated as 18 occupy horizontal positions at diametrically opposite sides of the burner, while the two series of openings 19 are inclined toward the bottom of the shell 1. The gaseous fuel supplied to the burner issues in jets from the horizontal and inclined series of openings, and thus the flame due to the ignition of the gaseous fuel is projected on horizontal and downwardly-inclined lines in the central space 11 of the shell. The mixing-tube 16 extends upwardly through the air-inlet tube 2, and at its upper end it carries a mixer 20, which is provided with a chamber 21. On one side of this mixer 20 is provided a nozzle 22, to which may be attached a supply-pipe 23, adapted to be coupled to a suitable source of gas-supply, either a gas-fixture communicating with a city main, a tank, or any suitable source of supply. Below the chamber 21 of the mixer is provided an air-inlet orifice 24, and the mixer is further provided with a gas-outlet port 25, which is in axial alinement with the mixing-tube 16. The volume of gas permitted to pass through the port 25 is regulated by a needle-valve 26, which is preferably of conical form and which finds a suitable bearing in a plug 27. The gas under pressure flows through the port 25 when the valve is adjusted to open the latter, and as the gas flows under pressure into the mixing-tube 16 air is drawn through the opening 24, whereby the gas and air are combined as they pass through the tube 16 to the burner 15.

In a submerged heater such as described it is necessary to provide means by which the air and gas may be thoroughly commingled before gaseous fuel is admitted to the burner, and to this end I provide in a submerged heater a new element—to wit, an upright mixing-flue. Said flue is located, preferably, in the air-inlet flue, and its lower end is arranged to discharge to the burner. The air and gas inlets are arranged in such relation to the mixing-flue as to insure the free and uninterrupted ingress of the air to the said flue along with the gas, and, as shown by the drawings, the air-inlet port 24 is located contiguous to the open end of the air-inlet flue 2, although this specific location of the air-port is not essential. The specified arrangement of the flue and the air and gas inlets thereto is important for two reasons—first, the free and unobstructed ingress of the proper quantity of air to the gas for supporting combustion is assured, and second, the air and gas are intermingled and combined before they enter the burner and as they circulate through the tube or flue 16. The arrangement of the air and gas supply provides for the employment of an elongated tube or flue, and said flue insures the admixture of the gas and air as the current flows to the burner, thereby producing a gaseous fuel which may be consumed by the burner without the emission of smoke.

The curved partition or deflector 4 is provided with a transverse opening 30, which is formed therein at a point immediately opposite to the free end of the burner 15, and said partition is furthermore provided with flanges or guideways 31, which are disposed adjacent to the opening 30. In these guideways is slidably fitted the regulator or damper 32, which is adapted to be raised for the purpose of exposing the opening 30, so as to permit the air to pass through the central space 11 direct into the flue 3, or which damper may be closed for the purpose of causing the heat to circulate in the flues 12 13 and thence into the flue 10 before the heat can pass into the outlet-flue 3 of the heater. This regulator or damper 32 is adapted to be operated when the heater is partially submerged in the water, and to this end I provide the operating rod or stem 33, which extends upwardly through the outlet-flue 3. I prefer to provide a rod as the operating-stem, which rod is loosely fitted in suitable guides or keepers 34, fixed within the tube 3, and the lower end of the stem-like rod is loosely connected to the damper or regulator so as to permit the handle 35 of the rod to be adjusted to rest upon the upper edge of the tube 3 for the purpose of holding the rod and the damper in their raised positions.

The employment of this damper in connection with the divided shell and the burner serves important purposes in my improved submerged heater. When the damper is opened, it provides for ready and convenient lighting of the burner when the heater is submerged, because a lighted taper can be passed down through the tube 3 and its flame applied against the head of the burner to ignite the gaseous fuel issuing from the ports in said head of the burner, from which ports the flame will spread in a well-known manner to ignite the fuel issuing from the other ports in the tubular burner. A further advantage of this damper or regulator is that it changes the course of the draft through the shell 1, whereby either a direct draft from the inlet-tube 2 through the central space 11 and thence to the outlet-tube 3 may be obtained, or an indirect draft from the tube 2 through the central space 11, the flues 12 13, and the flue 10 and thence to the outlet-tube 3 may be secured. When the damper is raised to expose the opening 30, a direct draft is obtained in the manner described; but when the damper is lowered the indirect draft exists and the heat is caused to pursue the tortuous course. The admission of air from the tube 2 to the central space 11 is obtained above the burner, and the downward flow of air upon the burner tends to deflect the heat toward the bottom of the shell 1, whereby the heat is applied against the bottom as well as against the walls and top of the shell. This is an important feature of my improved heater, because it secures uniform heating of all parts of the shell and enables the structure to heat the water quickly and with less consumption of fuel. I provide my heater with short legs or standards 29, which are attached to the bottom of the shell 1 and which serve to raise the heater somewhat above the tub or other receptacle in which the heater is placed, thus enabling water to obtain access to the shell on all sides thereof.

This being the construction of my improved submerged heater, the operation may be described briefly as follows: The heater is placed in the water until it rests on the bottom of the tub or vessel, the tubes 2 3 extending above the surface of the water to provide for the free ingress of air to the burner and for the circulation of air and heat from the shell through the outlet-tube 3. The weight of the cast-metal partitions or deflectors tends to keep the heater steadily in position. The needle-valve is opened and gas is permitted to flow into the mixing-tube to draw air through the port in the mixer and the gas and air are commingled and combined in the tube 16 previous to flowing into the burner-tube 15. The damper is raised by operating the valve and a lighted taper is thrust through the tube 3 and applied to the head of the burner to ignite the gaseous fuel issuing from the apertures in the tube. The draft through the shell is direct while the damper is raised; but when the damper is closed the draft is in the indirect course previously described. The heat is distributed to be applied to all parts of the shell for the purpose of heating the water in all directions around the shell; but after the water shall have been raised to the desired temperature the damper may be opened to permit the greater portion of the heat to pass through the tube 3 and escape from the heater into the room for the purpose of warming the same.

My improved heater is simple and compact in construction, easily handled, and readily controlled. The heater may be used in any desired quantity of water—that is to say, to heat a small quantity or a large volume of water—and it is equally effective in either relation. The structure may be used for any and all purposes for which a compact easily-controlled heater is desirable.

I am aware that changes in the form and proportion of parts and in the details of construction of the devices herein shown and described as the preferred embodiment of the invention may be made by a skilled mechanic without departing from the spirit or sacrificing the advantages of my invention. I therefore reserve the right to make such alterations and modifications as fairly fall within the scope of the invention.

In my improved heater I provide a handle 26$^b$, which is attached to the tubes 2 3, to serve as a means for readily lifting the heater out of the water or of placing it in the same. This handle is arranged in a horizontal position between the tubes, and it serves as a stay for holding the tubes in proper relation to each other. The handle is shown as consisting of a coil of wire with its ends fastened to the tubes; but any suitable construction of handle of wood or metal may be employed.

Having thus fully described my invention, what I claim as new, and desire to secure by Letters Patent, is—

1. A submerged heater comprising a shell having a heating-chamber, a burner-tube situated within said chamber and provided in its lower side with the downwardly-facing flame-openings, an air-inlet tube extending into said chamber of the casing to discharge the incoming current of air upon the burner-tube, an outlet-tube coupled to said casing, and a fuel-supply tube extending through the inlet-tube and coupled to the burner-tube, substantially as described.

2. A submerged heater comprising an interiorly-divided casing having a heating-chamber and a circulating-flue communicating with said chamber by unobstructed and damper-controlled openings or ports, a burner-tube situated within the heating-chamber, an air-inlet tube extending into the heating-chamber to discharge its current of air upon the burner-tube, a fuel-supply tube leading through the air-inlet tube and coupled to the burner-tube, and an outlet-tube communicating with the circulating-flue of said chamber, substantially as described.

3. In a submerged heater, a shell provided with the interior partitions forming a burner-chamber and the circulating-flues, one of said partitions having a port communicating with said chamber, and a burner-tube housed within the chamber, combined with an air-inlet tube discharging to said chamber over the burner-tube, a circulating-tube attached to said casing to communicate with the circulating-flue, a damper in the circulating-tube and adapted to close the port in said partition, and means in the inlet-tube to supply fuel to the burner, substantially as described.

4. In a submerged heater, a shell having its interior divided into flues by the curved partition, 4, and the short partitions, 5, 6, combined with a burner situated in the space formed by and between said partitions, an air-inlet flue coupled to the shell to supply air to the central space of the shell and above the burner, and an outlet-tube coupled to the shell to communicate with the flue which surrounds the partition, 4, substantially as and for the purposes described.

5. In a submerged heater, a shell provided with the interior partition, 4, and with the partitions, 5, 6, and also provided with an opening, 30, in said partition, 4, combined with a burner contained within the central space of the shell and arranged adjacent to the opening, 30, a slidable damper mounted on the partition, 4, to close or expose the opening, 30, circulating-flues communicating with the flues in said shell, and means for operating the damper, substantially as described, for the purposes set forth.

6. In a submerged heater, the combination of a shell having the circulating-tubes, a series of cast-metal partitions or deflectors secured within the shell to weight the same and to divide its chamber into tortuous flues, a burner housed within the chamber of the shell, a damper situated in one of said circulating-tubes to change the course of the heat through the casing, and means situated in the other circulating-flue for supplying gaseous fuel to the burner, substantially as and for the purposes described.

7. In a submerged heater, the combination of a shell, having its interior divided to form tortuous flues, circulating-tubes attached to the shell to communicate with different flues in the shell, a burner housed within the shell, on a horizontal plane below said circulating-flues and provided in its lower side with the downwardly-facing openings, means for supplying gaseous fuel to said burner, and a damper contained within the shell and operated by means extending through one of the circulating-tubes, substantially as described, for the purposes set forth.

8. In a submerged heater, the combination of an interiorly-divided shell, the air inlet and outlet tubes coupled to the shell, a burner contained within one of the flues in the shell, a mixing-tube extending through the air-inlet tube and coupled at one end to the burner, a mixer attached to the mixing-tube, and a damper contained within the shell and having an operating-stem which passes through the air-outlet tube, substantially as and for the purposes described.

9. In a submerged heater, the combination with a chamber and circulating-flues connected therewith, of an upright mixing-flue communicating with said chamber, a burner located in the chamber, and air and gas inlets to said flue and located to insure the free ingress of air thereto, substantially as described for the purposes set forth.

10. In a submerged heater, the combination with a chamber and a burner, of an air-inlet flue communicating with said chamber, an outlet-flue also connected to said chamber, an upright mixing-flue connected to the burner, air and fuel inlets connected to said mixing-flue and located at a point to insure free ingress of air to said flue, and a damper arranged to cut off direct communication between said chamber and the outlet-flue, or to establish unbroken communication between said chamber and flue, substantially as described.

11. In a submerged heater, the combination with a chamber, and a burner therein, of air inlet and outlet flues connected to said chamber, an upright mixing-flue extending through the inlet-flue and connected to the burner, an air-inlet to the mixing-flue located at a point to insure free ingress of air to said flue, and a fuel-supply connected to the mixing-flue contiguous to the air-inlet, for the purpose described, substantially as set forth.

12. A submerged heater, comprising a chamber, a burner located in said chamber and having flame-openings on all sides thereof to direct the flame against the bottom, walls and top of said chamber, circulating-flues communicating with the chamber, a mixing-flue connected to said burner, substantially as described, and air and gas inlets to said flue and located to insure the free ingress of air thereto.

In testimony that I claim the foregoing as my own I have hereto affixed my signature in the presence of two witnesses.

EDWARD J. BYRNE.

Witnesses:
 H. F. BERNHARD,
 JOHN H. SIGGERS.